Jan. 29, 1952     R. C. LARSEN     2,583,655
TRIPPING MECHANISM FOR REVOLVING RAKES
Filed Oct. 3, 1946     4 Sheets-Sheet 1
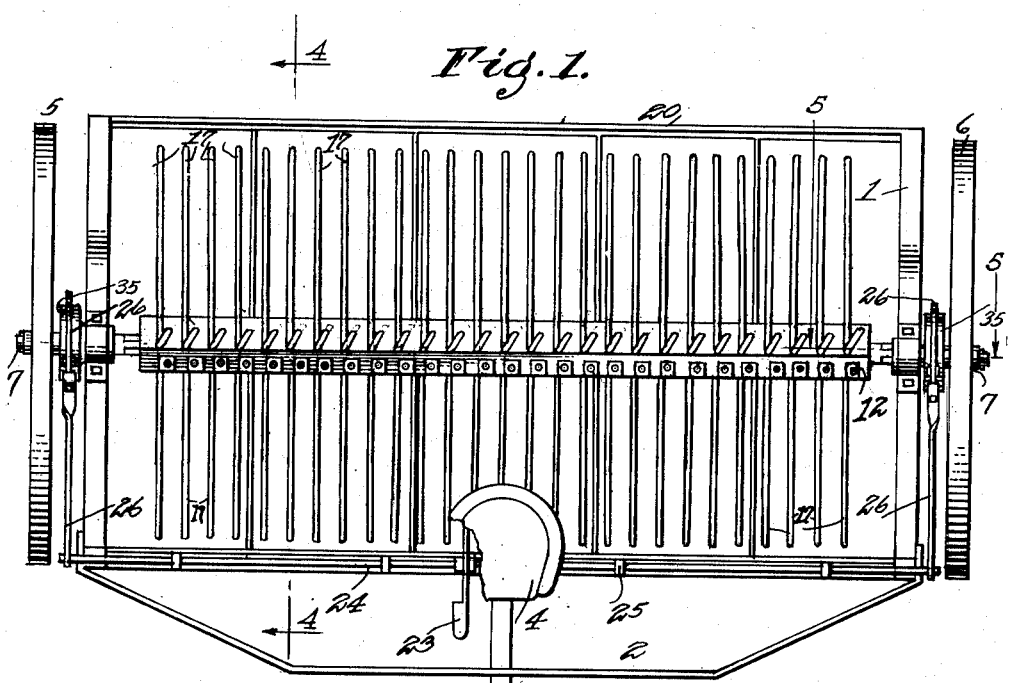
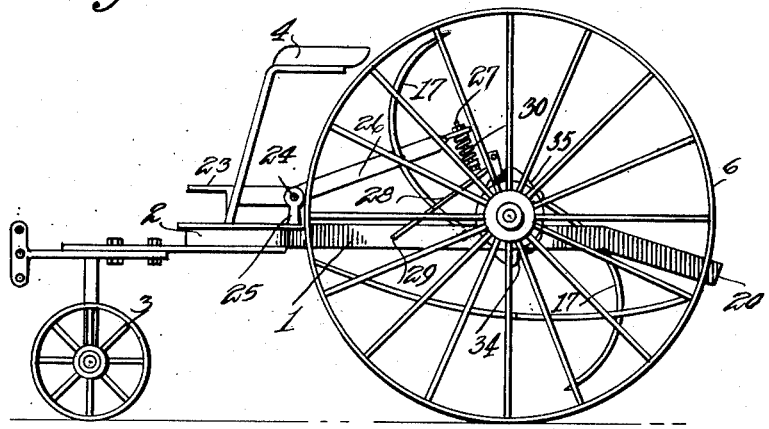
INVENTOR.
Russell C. Larsen,
BY Victor J. Evans & Co.
ATTORNEYS Jan. 29, 1952    R. C. LARSEN    2,583,655
TRIPPING MECHANISM FOR REVOLVING RAKES
Filed Oct. 3, 1946    4 Sheets-Sheet 2
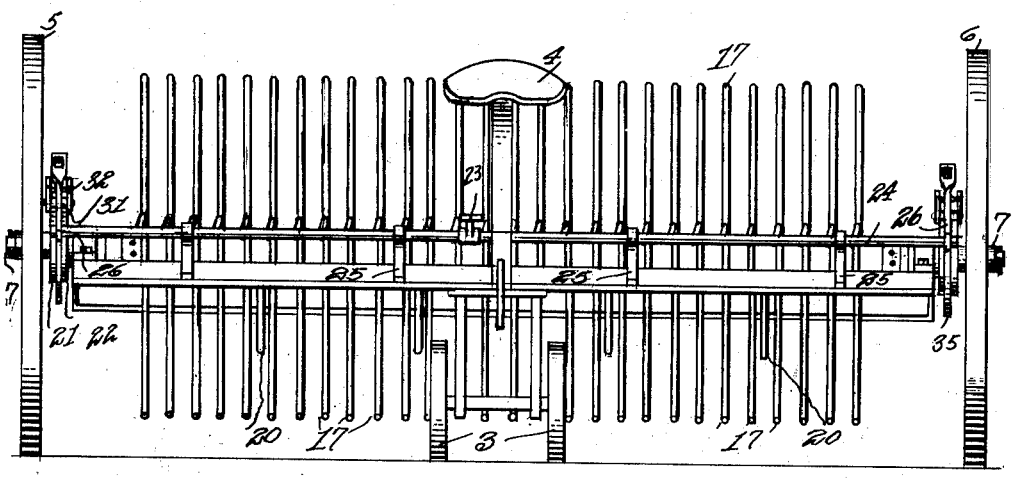
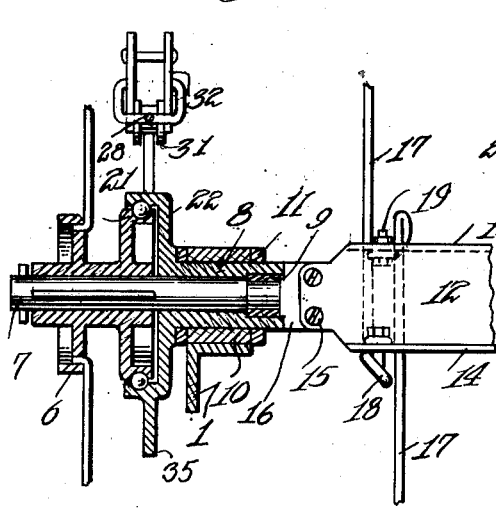
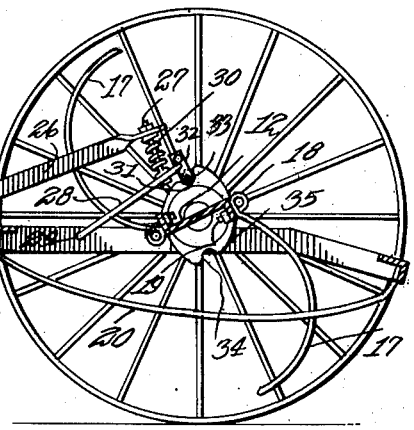
INVENTOR.
Russell C. Larsen.
BY Victor J. Evans & Co.
ATTORNEYS Jan. 29, 1952     R. C. LARSEN     2,583,655
TRIPPING MECHANISM FOR REVOLVING RAKES
Filed Oct. 3, 1946     4 Sheets-Sheet 3
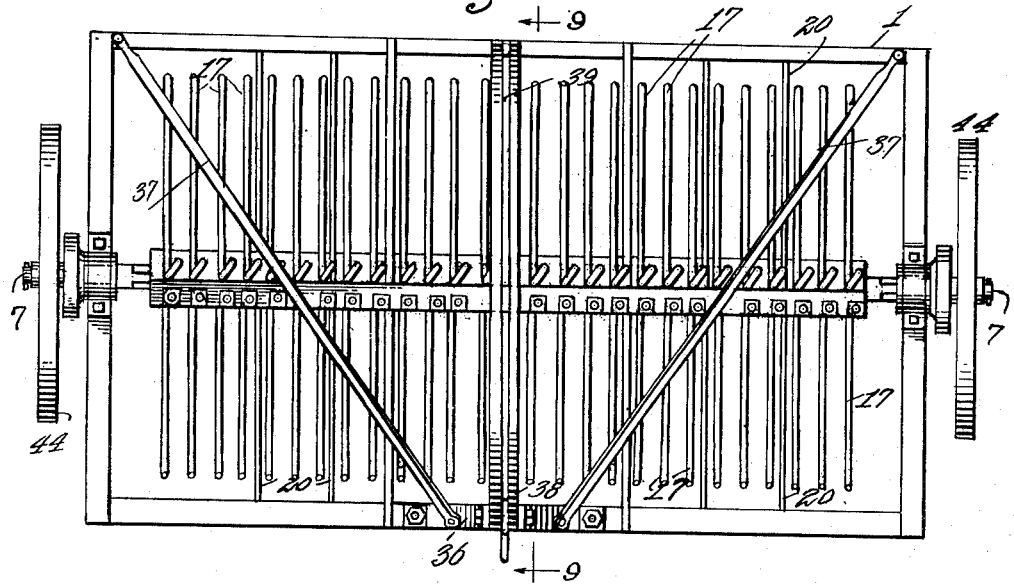
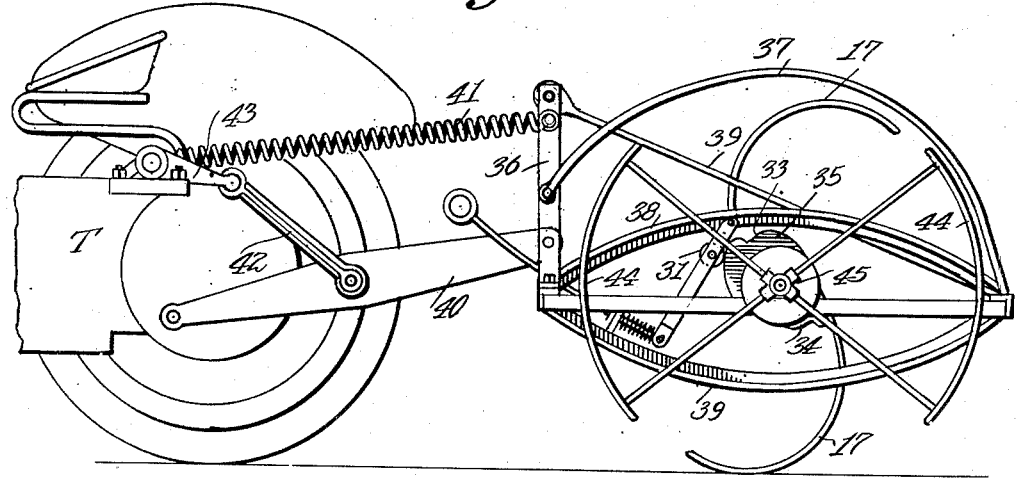
INVENTOR.
Russell C. Larsen.
BY Victor J. Evans & Co.
ATTORNEYS Jan. 29, 1952     R. C. LARSEN     2,583,655
TRIPPING MECHANISM FOR REVOLVING RAKES
Filed Oct. 3, 1946     4 Sheets-Sheet 4
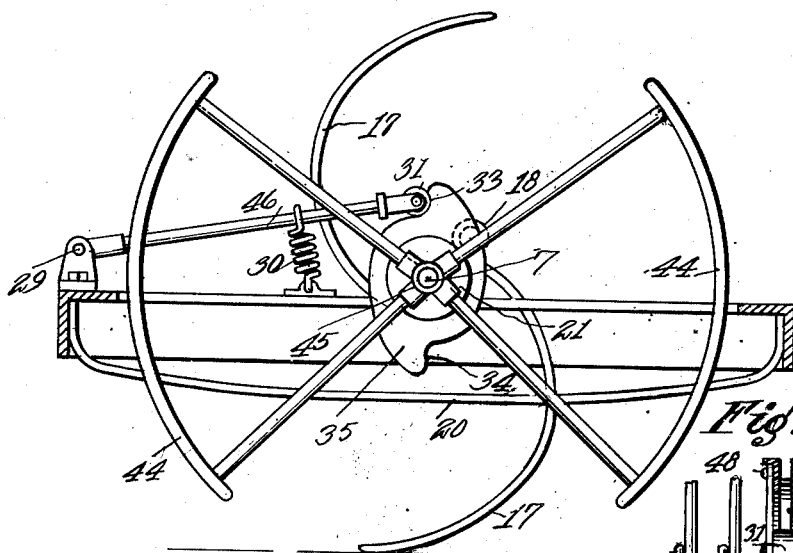
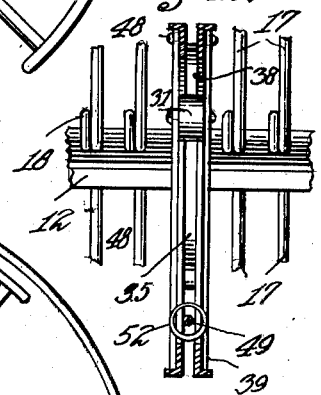
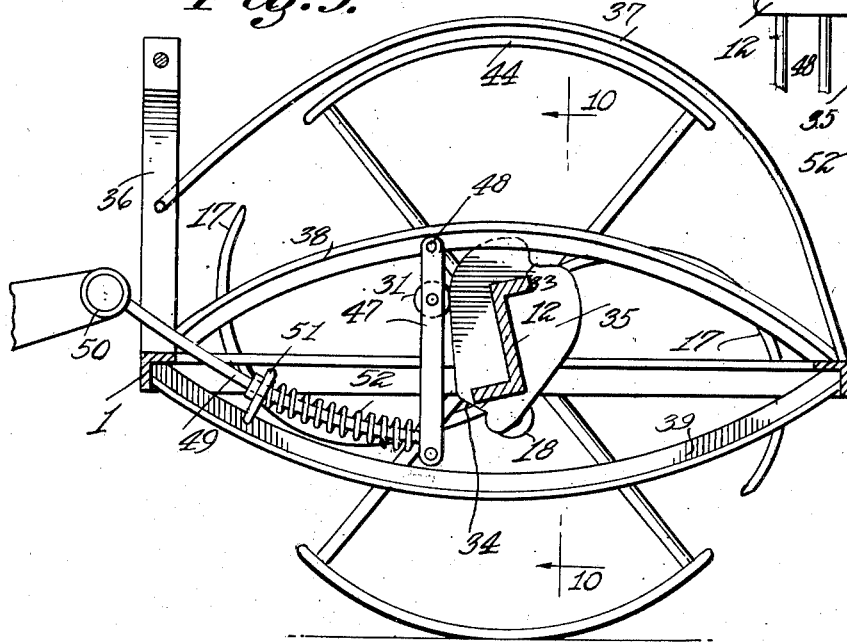
INVENTOR.
Russell C. Larsen
BY Victor J. Evans & Co.
ATTORNEYS Patented Jan. 29, 1952

2,583,655

UNITED STATES PATENT OFFICE 2,583,655

TRIPPING MECHANISM FOR REVOLVING RAKES

Russell C. Larsen, Hansen, Idaho

Application October 3, 1946, Serial No. 700,938

2 Claims. (Cl. 56—387)

My present invention relates generally to improvements in wheel-supported hay rakes of the vehicle-actuated, rear delivery type, and more specifically to the tripping mechanism for revolving rakes that is mechanically and automatically operated for controlling the gathering and delivery of windrows or bundles of hay as the implement is drawn by horse power, or by tractor power.

The primary object of the invention is the provision of an agricultural implement of this type which is simple in construction, durable, and facile in operation; which may be manipulated and maneuvered with convenience, and is free to move backward when necessary. By the mechanically and automatically operated tripping mechanism the revolving rake is controlled to insure efficiency and economy in its operations together with reliable and regular performance of its functions.

The invention consists broadly in certain novel combinations and arrangements in an implement of this type involving a revolving rake-head or axle having one or more rows of tines and vehicle-actuated, and a stop-rotor rigid with the revolving axle, together with a spring-actuated detent mechanism mounted in the path of the rotor, whereby the axle is stopped with its row of tines in raking position, and means for releasing the loaded tines to deliver the gathered hay.

In the accompanying drawings I have illustrated one complete example of the physical embodiment of my invention wherein the parts are combined and arranged in accord with my invention; but it will be understood that changes and alterations may be made in these exemplifying drawings and mechanical structures, as depicted in the several modifications, within the scope of my claims without departing from the principles of my invention.

Figure 1 is a top plan view of a rake in which my invention is embodied; and Figure 2 is a view in side elevation of the rake.

Figure 3 is a view in front elevation of the implement.

Figure 4 is a vertical sectional view longitudinally of the implement, taken on line 4—4 of Figure 1.

Figure 5 is an enlarged detail sectional view taken on line 5—5 of Figure 1 showing part of the rake head or revolving axle, together with a stud shaft for one of the vehicle wheels, a clutch device, and part of the spring pressed tripping mechanism.

Figure 6 is a top plan view of a modified form of the implement, wherein the implement is adapted to be drawn by a tractor, and in that the implement is provided with segmental wheels.

Figure 7 is a view in side elevation of the implement in Fig. 6, being propelled by a tractor, and having a modified form of tripping mechanism;

Figure 8 is an enlarged detail view showing a side elevation of the rake as shown in Figure 7 with the side angles shown in section.

Figure 9 is a longitudinal section also on an enlarged scale illustrating a modified form of the spring detent, and taken on line 9—9 of Figure 6.

Figure 10 is a detail sectional view at line 10—10 of Fig. 9.

In carrying out my invention as disclosed in the horse-drawn implement of Figs. 1 through 5 I employ a rectangular main frame 1 having a front extension 2, pilot wheels 3, and the driver's seat 4. Two traction wheels 5 and 6 support the frame, and each of the wheels is keyed upon a short stud shaft, as 7, which extends inwardly from its complementary wheel, and passes through a trunnion or bearing sleeve 8 having a retaining-collar recess to accommodate the collar 9 that is rigidly mounted on the stud shaft to prevent longitudinal displacement of the stud shaft.

The trunnions 8 project inwardly from the wheels and they are journaled to revolve in bearings 10 mounted on the end angle bars of the main frame 1, a retaining collar 11 being provided on the trunnion for confining it in its bearing.

By means of a central transversely extending axle 12, which is somewhat Z-shape in cross section and fashioned with flanges 13 and 14, the two trunnions are rigidly united, as by means of bolts 15 that fasten the axle ends to complementary flanges 16 on the inner ends of the trunnions, and the angular axle supports two row of raking teeth or tines 17.

Each of the teeth or tines 17 in both rows are fashioned with a spring loop 18, and the looped inner end of each tooth or tine is attached, as by a bolt 19 to an attaching flange of the axle.

The two rows of tines or teeth are spaced apart through angles of one hundred and eighty degrees, and they are arranged diametrically opposite on the axle to revolve over and down and rearwardly and upwardly with a counterclockwise movement in Figs. 5 and 6, and longitudinally extending cleaning rods 20, which are attached at their ends to the front and rear cross bars of the main frame 1, are interspersed between adjoining tines of the rows to clear the rake and dump a windrow or bunch of raked hay upon the ground.

By this arrangement of the two rows of tines or teeth, the revolving rake may intermittently be stopped and held stationary with relation to the implement, while the traction wheels continue to turn and roll over the ground, with the lower or under row of tines in raking position. Thus, as the horse drawn implement advances over the ground, the stopping of the rotary rake, and re-setting of the rows are timed in relation to a given distance of travel for a raking operation.

The rotary raking member with its two rows of teeth and its trunnions, is driven from the traction wheels 5 and 6 by means of a pair of clutches of suitable design, such for instance as overrunning clutches of the ball type, which permit the rotation of the rake member to be arrested while the implement wheels continue to roll. In the example of an overrunning clutch in Fig. 5 the driving member of the clutch, as 21, is rigid with the hub of the wheel 6, and the wheel is keyed or otherwise secured upon the stud shaft 7; the driven member 22 of the clutch is rigidly fixed to revolve with the trunnion 8 of the raking member; and the intermediate ball or balls co-act with the members to actuate the one-way clutch, which is automatically disengaged when the movement of the rotating rake is arrested.

For controlling the operation of the rotary rake a pedal actuated mechanism is located in position for ready access by the foot of the driver of the implement occupying the seat 4 and for this purpose a pedal lever 23 is fixed on a transversely extending rock shaft 24 that is journaled in bearings 25 mounted on the front of the main frame, with the ends of the rock shaft terminating at the opposite sides of the frame.

On the opposite ends of the rock shaft are fixed, rearwardly extending lever arms 26, each having a flattened free end having a hole to receive the upper end of a bolt or link 27. The lower end of the link is anchored to a detent lever 28 that is pivoted at 29 on a suitable part of the main frame 1, and an expansion spring 30 is coiled about the link and interposed between the lever arm 26 and the detent lever 28, to urge the detent away from the lever arm.

A detent, or stop, which may be in the form of a grooved roller 31 is journaled in a frame or bracket 32 rigidly mounted in adjusted position upon the detent lever, and this detent co-acts, alternately, with a pair of notches 33 and 34 of a vertically disposed, elliptical plate or cam 35 that performs the functions of a rotor and forms a track for the roller 31.

One of the rotors 35 is mounted at each end of the rotary rake, and as shown in Fig. 6 the rotor may be rigidly fixed with the driven clutch member 22 of the rake; or otherwise secured to turn with the rake. The two notches 33 and 34 are spaced one hundred and eighty degrees apart and diametrically arranged with relation to the detent so that the latter may stop the rotation of the rake with one row of teeth or tines in raking position as indicated in Figs. 4 and 5. Then, as the implement advances across the field this stationary lower row of teeth or tines gathers a bundle of hay; the pedal 23 is depressed to lift the detent 31 from the path of the rotor; the clutches automatically engage the rake; and the rake turns with the wheels 5 and 6. The cleaning rods 20 dislodge the gathered bundle of hay from the rake, which bundle is dropped as a windrow, and the continued turn of the rake brings the second notch to the upper position. Before reaching its uppermost position, or simultaneously with this movement of the notched rotor, the depressed pedal is released, and the spring 30 throws the detent into the path of movement of the rotor for a second raking operation.

In Figs. 6 through 10, a modified form of the invention is illustrated in a raking implement that is especially adapted to be drawn by a tractor T, having a hydraulic lift, by means of which the implement may be drawn over the field for raking operations, as well as lifted to inoperative position for transportation.

The implement is coupled at the rear of the tractor by means of a front coupling yoke 36, of inverted Y-shape that is attached by welding, or bolts, at the center of the front bar of the main frame 1, and the yoke is braced in upright position by two diagonally extending arch bars 37, 37, and additional braces 38, 39, which rigidly unite the yoke with the frame.

A pair of spaced draft links 40 are pivotally coupled at their ends to the tractor and to the yoke, and a spring 41 may be employed to connect the frame and tractor to absorb relative movements between the tractor and the implement trailing behind it.

By power from a hydraulic lift or other auxiliary (not shown) of the tractor, together with operating link 42 and rotary lever 43 in Fig. 7, the tractor may be employed to lift the rake and swing it forwardly and upwardly out of operative position.

In this modified form of the invention segmental or mutilated wheels are substituted for the circular wheels, and as indicated two diametrically arranged segmental or arcuate rims 44, with spokes, and hubs 45 constitute each wheel, that is keyed on one of the stud axles 7; and the rake head or axle 10 is driven by the clutch 21—22.

The detent roller 31, which co-acts with the rotor and its notches 33, 34, is journaled in the forked end of a detent arm 46 that is pivoted on the main frame at 29, and the spring 30 anchored at its ends to the detent arm and a fixed support on the frame respectively, tends to resiliently hold the roller 31 in frictional rolling contact with the edge of the revolving stop-rotor 35.

As shown in Fig. 7 the segmental wheels have rolled out of contact with the ground and the implement is supported with the lower row of tines or teeth in raking position and dragging on the ground, the trip mechanism being effective to hold the rake stationary with respect to the implement. As the vehicle advances the hay is gathered by the row of teeth and accumulates in a bundle beneath the cleaner rods 20, until the pressure of the hay-load reaches a degree at which the resiliently held roller 31 is pushed upwardly, against tension of spring 30, along and over the cam notch 33, thus releasing the detained rake. The continuing load-pressure of the accumulating bundle also forces the row of rake teeth to discharge the windrow of hay upon the ground at the rear of the implement, and the continued turning of the rake head or axle results in engagement of the driving clutch or clutches of the traction wheels. The segmental wheels now take up the load of the implement with a rolling movement and the revolving rake and wheels are turned through an angle of one hundred and eighty degrees to bring the notch 34 into engagement with the detent roller 31 for a succeeding raking operation by the second row of teeth.

In the further modified form of the invention in Figs. 9 and 10 another tractor-towed implement is shown with a change in the construction and operation of the spring detent, where the roller 31 is journaled in a vertically suspended lever 47 that is pivoted at 48 on one of the arch braces 38, and an operating pull-link 49 is provided with a coupling eye 50 at the front of the implement for connection to a manually controlled pull device (not shown) of the tractor. The link 49 is slidably supported in a fixed bearing bracket 51, and spring 52 coiled about the link tends to resiliently hold the roller 31 in rolling contact with the edge of the stop-rotor 35. The under row of teeth is held in raking position by co-action of the roller and one of the notches 33, 34, and the revolving rake is released, manually, by a pull on link 49.

Having thus fully described my invention, what I claim as new and desire to secure by Letters Patent is:

1. In a hay rake, the combination which comprises a substantially horizontally disposed rectangular shaped frame having side and end bars, a transversely disposed horizontally positioned axle having diametrically opposed tines thereon positioned in the frame, stub shafts extended from the ends of the axle, bearings rotatably mounting the said stub shafts in the side bars of the frame, diametrically opposed arcuate segments journalled on the outer ends of the stub shafts positioned to frictionally engage the ground over which the rake is traveling for turning the axle and tines, cams having diametrically opposed stop notches therein mounted on said stub shafts, rollers pivotally mounted on the side bars of the frame and positioned to travel on the said cams for engaging the said stop notches to retain the tines of the rake in raking positions, and means manually releasing the said rollers from the said stop notches whereby the tines are actuated to dump the hay raked thereby by the weight of the hay and to set the diametrically opposed tines in raking position.

2. In a hay rake, the combination which comprises a substantially horizontally disposed rectangular shaped frame having side and end bars, a transversely disposed horizontally positioned axle having diametrically opposed tines thereon positioned in the frame, stub shafts extended from the ends of the axle bearings rotatably mounting the said stub shafts in the side bars of the frame, diametrically opposed arcuate segments journalled on the outer ends of the stub shafts positioned to frictionally engage the ground over which the rake is traveling for turning the axle and tines, cams having diametrically opposed stop notches therein mounted on said stub shafts, rollers pivotally mounted on the side bars of the frame and positioned to travel on the said cams for engaging the said stop notches to retain the tines of the rake in raking positions, and means manually releasing the said rollers from the said stop notches whereby the tines are actuated to dump the hay raked thereby by the said segments which also set the diametrically opposed tines in the raking position.

RUSSELL C. LARSEN.

REFERENCES CITED

The following references are of record in the file of this patent:

UNITED STATES PATENTS

| Number | Name | Date |
|---|---|---|
| 174,113 | Brown | Feb. 29, 1876 |
| 325,511 | Donnell | Sept. 1, 1885 |
| 538,530 | Lunday | Apr. 30, 1895 |
| 855,686 | Bacon | June 4, 1907 |
| 1,502,507 | Link | July 22, 1924 |
| 2,436,245 | Bloom | Feb. 17, 1948 |
| 2,472,953 | Meyer | June 14, 1949 |